US012744327B2

(12) United States Patent
Xiang

(10) Patent No.: US 12,744,327 B2
(45) Date of Patent: Sep. 22, 2026

(54) ANTENNA UNIT, ANTENNA ARRAY, AND ELECTRONIC DEVICE

(71) Applicant: Beijing Xiaomi Mobile Software Co., Ltd., Beijing (CN)

(72) Inventor: Lei Xiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 72 days.

(21) Appl. No.: 18/888,723

(22) Filed: Sep. 18, 2024

(65) Prior Publication Data

US 2025/0300362 A1 Sep. 25, 2025

(30) Foreign Application Priority Data

Mar. 22, 2024 (CN) ......................... 202410339353.8

(51) Int. Cl.
*H01Q 19/00* (2006.01)
*H01Q 9/04* (2006.01)
*H01Q 21/06* (2006.01)

(52) U.S. Cl.
CPC ......... *H01Q 19/005* (2013.01); *H01Q 9/0407* (2013.01); *H01Q 21/065* (2013.01)

(58) Field of Classification Search
CPC .... H01Q 5/385; H01Q 9/0407; H01Q 9/0421; H01Q 19/005; H01Q 21/065; H01Q 21/20; H01Q 21/24
See application file for complete search history.

(56) References Cited

FOREIGN PATENT DOCUMENTS

| | | | | |
|---|---|---|---|---|
| CN | 101710649 B | * 11/2012 | ............. | H01Q 13/08 |
| CN | 107359407 A | * 11/2017 | ............... | H01Q 1/50 |
| CN | 215600567 U | * 1/2022 | ............... | H01Q 9/04 |

OTHER PUBLICATIONS

Hu, Wei et al., "Wideband Circularly Polarized Microstrip Patch Antenna With Multimode Resonance", IEEE Antennas and Wireless Propagation Letters, vol. 20, No. 4, Apr. 2021, 5 pages.
Wong, Kin-Lu et al., "Low-Profile Wideband Four-Corner-Fed Square Patch Antenna for 5G MIMO Mobile Antenna Application", IEEE Antennas and Wireless Propagation Letters, vol. 20, No. 12, Dec. 2021, 5 pages.
Cao, Yufan et al., "Broadband and High-Gain Microstrip Patch Antenna Loaded With Parasitic Mushroom-Type Structure", IEEE Antennas and Wireless Propagation Letters, vol. 18, No. 7, Jul. 2019, 5 pages.
Extended European Search Report Issued in Application No. 24210797.7 dated Apr. 23, 2025, 10 pages.

* cited by examiner

*Primary Examiner* — Hoang V Nguyen
(74) *Attorney, Agent, or Firm* — Finnegan, Henderson, Farabow, Garrett & Dunner, L.L.P.

(57) ABSTRACT

An antenna unit includes: a radiation assembly including at least one radiation patch and at least one parasitic patch; a dielectric layer including a layer of dielectric substrate; a floor layer; and at least one feed structure, wherein the radiation assembly is located on a top surface of the dielectric layer; the floor layer is located on a bottom surface of the dielectric layer; and the least one feed structure passes through the floor layer and the dielectric layer sequentially and is electrically connected to the at least one radiation patch, and the at least one radiation patch is coupled to the at least one parasitic patch.

19 Claims, 11 Drawing Sheets

ANTENNA UNIT, ANTENNA ARRAY, AND ELECTRONIC DEVICE

CROSS-REFERENCE TO RELATED APPLICATIONS

The present application claims the benefit of priority to Chinese Application No. 202410339353.8, filed on Mar. 22, 2024, the content of which is incorporated herein by reference in its entirety.

FIELD

The present disclosure relates to the field of antenna technology, and in particular to an antenna unit, an antenna array, and an electronic device.

BACKGROUND

With the development of communication technology, electronic devices need to support more and more frequency bands, and communication of signals in different frequency bands, such as 2G, 3G, 4G, 5G, etc., needs to be realized in electronic devices such as mobile phones. Moreover, millimeter-wave has the advantages of short wavelength, wide spectrum, fast transmission speed, etc., and has become one of the core technologies of 5G and even 6G communication in the future.

SUMMARY

In a first aspect, an antenna unit is provided, and the antenna unit includes: a radiation assembly including at least one radiation patch and at least one parasitic patch; a dielectric layer including a layer of dielectric substrate; a floor layer; and at least one feed structure. The radiation assembly is located on a top surface of the dielectric layer; the floor layer is located on a bottom surface of the dielectric layer; and the at least one feed structure passes through the floor layer and the dielectric layer sequentially and is electrically connected to the at least one radiation patch, and the at least one radiation patch is coupled to the at least one parasitic patch.

In a second aspect, an antenna array is provided, and the antenna array includes at least two antenna units as described in the first aspect. The at least two antenna units are arranged in an array, and floor layers of adjacent two antenna units are separated by a fracture.

In a third aspect, an electronic device is provided, and the electronic device includes an antenna unit as described in the first aspect or an antenna array as described in the second aspect.

BRIEF DESCRIPTION OF THE DRAWINGS

The accompanying drawings of the present disclosure will be briefly introduced below, and it is obvious that the drawings in the following description are only example embodiments of the present disclosure.

DETAILED DESCRIPTION

Illustrative embodiments are described in detail here, and examples are illustrated in the accompanying drawings. When the following description relates to drawings, the same number in different drawings represents the same or similar features, unless otherwise indicated. The implementations described in the following illustrative embodiments do not represent all implementations consistent with the present disclosure. Conversely, they are merely examples of devices and methods that are consistent with some aspects of the present disclosure as detailed in the attached claims.

Figure 1:
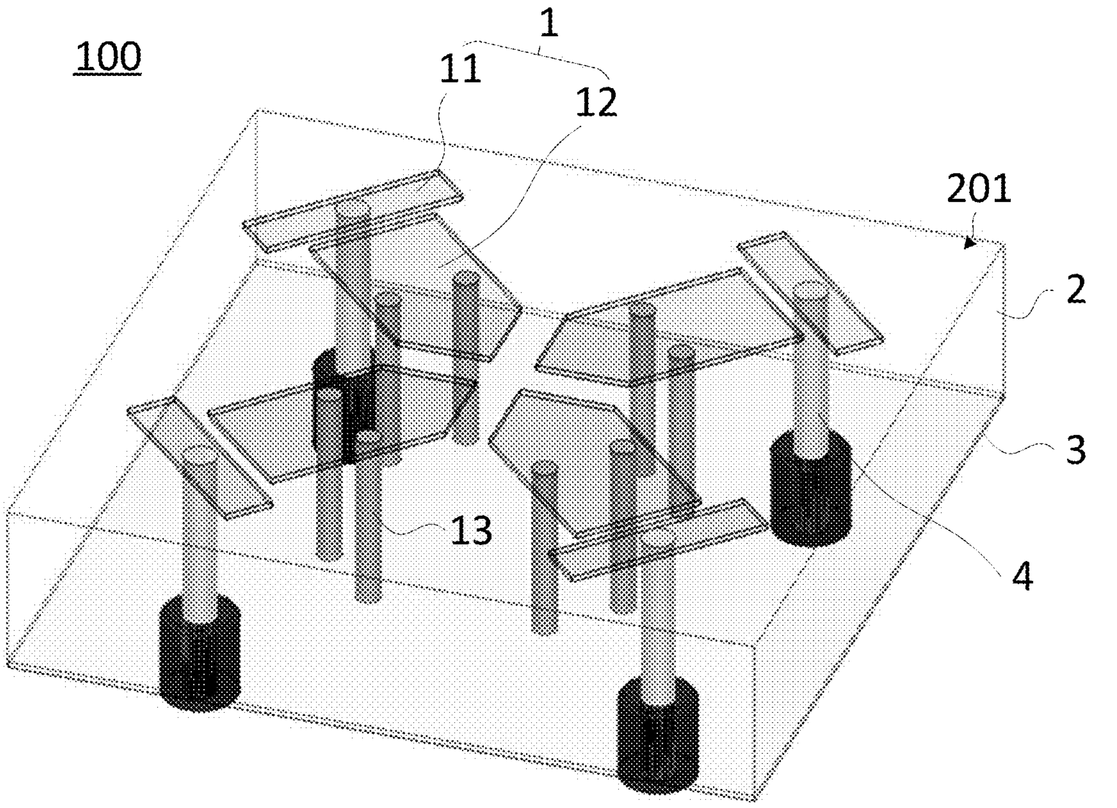
FIG. 1 is a schematic structural diagram of an antenna unit according to an embodiment of the present disclosure.

In the description of the present disclosure, it is understood that the terms “center”, “longitudinal”, “transverse”, “length”, “width”, “thickness”, “up”, “down”, “front”, “rear”, “left”, “right”, “vertical”, “horizontal”, “top”, “bottom”, “inner”, “outer”, “clockwise”, “counterclockwise”, “axial”, “radial”, “circumferential”, etc., indicate orientations or positional relationships based on the orientations or positional relationships illustrated in FIG. 1. It is only for the convenience of describing the present disclosure and for simplifying the description, and does not indicate or imply that the device or element referred to must have a particular orientation, be constructed and operated in a particular orientation, and therefore cannot be construed as a limitation of the present disclosure.

It should be understood that in the present disclosure, "electrical connection" may be understood as the physical contact and electrical conduction of components; it may also be understood as a form in which different components in the circuit structure are connected by physical lines that may transmit electrical signals, such as printed circuit boards (PCBs), copper foils, or wires. "Communication connection" may refer to the transmission of electrical signals, including wireless communication connections and wired communication connections. Wireless communication connections do not require a physical medium, and are not part of a connection relationship that defines the structure of the product.

Unless otherwise defined, all technical terms used in embodiments of the present disclosure have the same meanings as commonly understood by those of ordinary skill in the art.

The technical solutions provided in the present disclosure are applicable to electronic devices that adopt one or more of the following communication technologies: Bluetooth (BT) communication technology, Global Positioning System (GPS) communication technology, wireless fidelity (WiFi) communication technology, and Global System For Mobile Communications (GSM), Wideband Code Division Multiple Access (WCDMA) communication technology, Long Term Evolution (LTE) communication technology, 5G communication technology, and other communication technologies in the future.

The electronic device in embodiments of the present disclosure may be a mobile phone, a tablet computer, a laptop computer, a smart bracelet, a smart watch, a smart helmet, a smart glasses, etc. The electronic device may also be a cellular phone, a cordless phone, a Session Initiation Protocol (SIP) phone, a Wireless Local Loop (WLL) station, a Personal Digital Assistant (PDA), a handheld device with wireless communication capabilities, a computing device, or other processing devices connected to a wireless modem, a vehicle-mounted device, an electronic device in a 5G network, or an electronic device in a public land mobile network (PLMN) that will evolve in the future, which is not limited by embodiments of the present disclosure.

In some cases, the electronic device may perform a variety of functions (e.g., playing music, displaying videos, storing pictures, and receiving and sending phone calls). If desired, the electronic device may be such as a cellular phone, a media player, other handheld devices, a watch device, a pendant device, a handset device, or other compact and portable devices.

However, due to the development of electronic devices such as mobile phones towards ultra-thin thickness and full screen, the space left for antennas is becoming more and more limited. Therefore, how to ensure that the antenna achieves excellent performance such as broadband, high isolation and high stability under the premise of small size is a technical problem that needs to be solved urgently in the field.

In order to make the purpose, technical solution and advantages of the present disclosure more clear, embodiments of the present disclosure will be described in further detail below in conjunction with the accompanying drawings.

Figure 2:
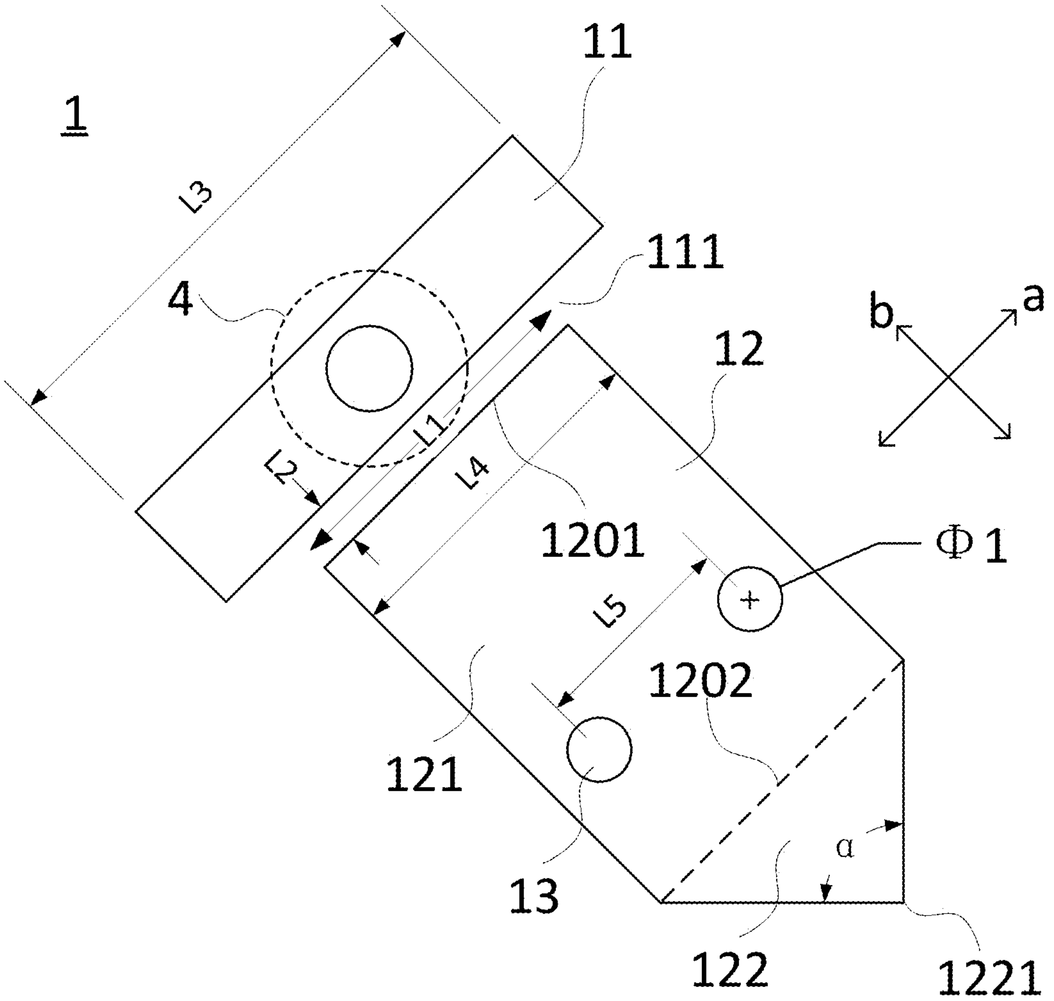
FIG. 2 is a schematic structural diagram of a radiation assembly according to an embodiment of the present disclosure.

In an aspect, as illustrated in FIGS. 1 and 2, the present embodiment provides an antenna unit 100, and the antenna unit 100 includes a radiation assembly 1, a dielectric layer 2, a floor layer 3 and at least one feed structure 4.

The radiation assembly 1 is located on a top surface 201 of the dielectric layer 2, and the floor layer 3 is located on a bottom surface 202 of the dielectric layer 2. The dielectric layer 2 includes a layer of dielectric substrate. The radiation assembly 1 includes at least one radiation patch 11 and at least one parasitic patch 12. The at least one feed structure 4 passes through the floor layer 3 and the dielectric layer 2 sequentially and is electrically connected to the at least one radiation patch 11, and the at least one radiation patch 11 is coupled to the at least one parasitic patch 12.

The antenna unit 100 of the present embodiment includes the radiation assembly 1, the dielectric layer 2, the floor layer 3 and the at least one feed structure 4, and the dielectric layer 2 adopts a single layer of dielectric substrate, such that the antenna unit 100 has a smaller thickness; the radiation assembly 1 includes the at least one parasitic patch 12 and the at least one radiation patch 11, the feed structure 4 is connected to the radiation patch 11, and the radiation patch 11 is used to couple and feed the parasitic patch 12, such that the antenna unit 100 achieves excellent performances such as miniaturization, broadband, high polarization isolation, stable and consistent radiation pattern, etc.

In some implementations, a material of the dielectric substrate is Rogers 4350, a dielectric constant is 3.66, and a loss tangent is 0.04. For example, the antenna unit 100 is used to realize transmission and reception of signals in the millimeter-wave frequency band. The millimeter-wave wireless communication technology operates between 30 GHz and 300 GHz. Due to its high frequency, the millimeter-wave has a high transmission speed and large bandwidth, which is suitable for achieving high-speed data transmission and low-latency communication. The millimeter-wave technology is widely used in 5G communication systems to support high-capacity, high-speed, and low-latency communication requirements.

However, in related art, millimeter-wave antennas generally have the problem of narrow bandwidth, and in order to expand the bandwidth, it is usually necessary to increase the number of layers of the dielectric substrates, so that the millimeter-wave antenna may meet the communication requirements of an electronic device 300. However, the multiple layers of dielectric substrates will lead to the increase of the thickness of the millimeter-wave antenna, on the one hand, it will increase the structural complexity and processing difficulty of the millimeter-wave antenna, resulting in a significant increase in cost; and on the other hand, the increase in the thickness of the millimeter-wave antenna is contrary to the thin and light development trend of the electronic device 300. The two reasons restrict the promotion and disclosure of the millimeter-wave antenna. In view of this problem, the antenna unit 100 of the present embodiment adopts the radiation patch 11 to couple the parasitic patch 12 for indirect feeding, this feeding mode may effectively expand the working bandwidth of the parasitic patch 12, so that a single-layer of dielectric substrate may be adopted; and the thickness of the antenna unit 100 is greatly reduced under the premise of ensuring the high bandwidth of the antenna unit 100, so that the structure of the antenna unit 100 is simple, the processing and manufacturing difficulty is low, the processing cost is low, and the system integration degree is better, which is in line with the thin and light development trend of the electronic device 300, and conducive to the promotion and disclosure of the millimeter-wave antennas in the electronic device 300.

As illustrated in FIG. 2, in some embodiments, the at least one radiation patch 11 extends in a rectangular shape along a first direction a, a first edge 1201 of the at least one parasitic patch 12 extends along the first direction a, the at least one radiation patch 11 and the at least one parasitic patch 12 are spaced apart along a second direction b, and the second direction b is perpendicular to the first direction a, such that the at least one radiation patch 11 and the first edge 1201 define a coupling gap 111, and an extension direction of the coupling gap 111 is parallel to the first direction a.

Through the above arrangement, the radiation patch 11 and the first edge 1201 of the parasitic patch 12 are spaced apart and arranged in parallel to form a gap coupling, the feed structure 4 is electrically connected to the radiation patch 11, the radiation patch 11 couples the RF signal indirectly to the parasitic patch 12 using the mode of electromagnetic induction with the air in the coupling gap 111 as a medium, instead of directly connecting the feed structure 4 to the parasitic patch 12, and this indirect coupling may reduce direct physical connection between elements of the antenna (such as the parasitic patch 12, the radiation patch 11 and the feed structure 4), reduce the possibility of interconnection interference, and improve the stability and performance of the antenna unit 100. By transmitting signals through air medium, the positions of the parasitic patch 12, the radiation patch 11 and the feed structure 4 may be arranged more flexibly in the design, to realize a more complex structure and function. This indirect coupling may also reduce the physical distance between the parasitic patch 12, the radiation patch 11 and the feed structure 4, and help to reduce a size of the whole antenna unit 100, which is especially suitable for the disclosure scenario of the compact space of the millimeter-wave antenna. Also the coupling loss in the signal transmission process may be reduced, the efficiency and performance of the antenna system may be improved, the anti-interference ability of the antenna unit 100 may be improved, the influence of external interference on the antenna performance may be reduced, and the communication quality and stability may be enhanced.

Therefore, thanks to the special coupling mode between the feed structure 4, the radiation patch 11 and the parasitic patch 12, the antenna unit 100 provided in the present embodiment may adopt a single-layer of dielectric substrate under the premise of ensuring the high bandwidth of the antenna unit 100, so that the thickness of the antenna unit 100 is greatly reduced, the structure of the antenna unit 100 is simple, the processing and manufacturing difficulty is low, the processing cost is low, and the system integration degree is better.

In some implementations, the radiation patch 11 and the parasitic patch 12 may be processed and formed by using a copper cladding process on the top surface 201 of the dielectric layer 2, or the radiation patch 11 and the radiant patch 12 may be separately processed and formed and then assembled to be connected to the top surface 201 of the dielectric layer 2.

As illustrated in FIG. 2, in some embodiments, a size of the coupling gap 111 along the first direction a is L1, and a size of the coupling gap 111 along the second direction b is L2, in which a value of L1/L2 ranges from 5 to 11. Through the above arrangement, the radiation assembly 1 may realize the transmission and reception of signals in the millimeter-wave frequency band, and has good working performance.

In some implementations, the value of L1/L2 may be 5, 5.5, 6, 6.5, 7, 7.5, 8, 8.5, 9, 9.5, 10, 10.5, 11, and so on. In some examples, the value of L1/L2 may be equal to 8.

In some implementations, the value of L1 may range from 0.5 mm to 1.1 mm. For example, the value of L1 may be 0.5 mm, 0.6 mm, 0.7 mm, 0.8 mm, 0.9 mm, 1.0 mm, 1.1 mm, and so on. In some examples, the value of L1 may be equal to 0.8 mm.

In some implementations, the value of L2 may range from 0.07 mm to 0.13 mm. For example, the value of L2 may be 0.07 mm, 0.08 mm, 0.09 mm, 0.1 mm, 0.11 mm, 0.12 mm, 0.13 mm, and so on. In some examples, the value of L2 may be equal to 0.1 mm.

As illustrated in FIG. 2, in some embodiments, a size of the radiation patch 11 along the first direction a is L3, and a size of the first edge 1201 along the first direction a is L4, in which a value of L3/L4 ranges from 1 to 2. Through the above arrangement, the radiation assembly 1 may realize the transmission and reception of signals in the millimeter-wave frequency band, and has good working performance.

In some implementations, the value of L3/L4 may be 1, 1.1, 1.2, 1.3, 1.4, 1.5, 1.56, 1.6, 1.7, 1.8, 1.9, 2, and so on. In some examples, the value of L3/L4 may be equal to 1.56.

In some implementations, the value of L3 may range from 0.75 mm to 1.75 mm. For example, the value of L3 is 0.75 mm, 0.8 mm, 0.9 mm, 1.0 mm, 1.1 mm, 1.2 mm, 1.25 mm, 1.3 mm, 1.35 mm, 1.4 mm, 1.5 mm, 1.6 mm, 1.7 mm, 1.75 mm, and so on. In some examples, the value of L3 may be equal to 1.25 mm.

In some implementations, the value of L4 may range from 0.5 mm to 1.1 mm. For example, the value of L4 may be 0.5 mm, 0.6 mm, 0.7 mm, 0.8 mm, 0.9 mm, 1.0 mm, 1.1 mm, and so on. In some examples, the value of L4 may be equal to 0.8 mm.

Figure 3:
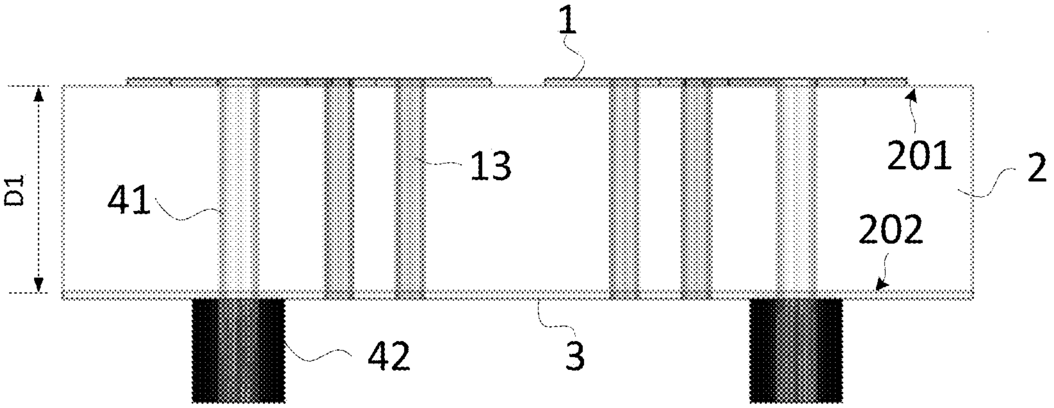
FIG. 3 is a structural side view of an antenna unit according to an embodiment of the present disclosure.

As illustrated in FIG. 3, in some embodiments, a value of a thickness D1 of the dielectric substrate ranges from 0.8 mm to 1.2 mm. When the thickness D1 of the dielectric substrate satisfies the above value range, the antenna unit 100 provided in the present embodiment may greatly reduce the thickness of the antenna unit 100 under the premise of ensuring the high bandwidth of the antenna unit 100, so that the structure of the antenna unit 100 is simple, the processing and manufacturing difficulty is low, the processing cost is low, and the system integration degree is better. For example, since the dielectric layer 2 has only one layer of dielectric substrate, the thickness of the dielectric layer 2 is the same as the thickness of the dielectric substrate, which is also 0.8 mm-1.2 mm.

In some implementations, the value of D1 may range from 0.8 mm to 1.2 mm. For example, the value of D1 is 0.8 mm, 0.85 mm, 0.9 mm, 0.95 mm, 1.0 mm, 1.05 mm, 1.1 mm, 1.15 mm, 1.2 mm, and so on. In some examples, the value of D1 may be equal to 1.0 mm.

As illustrated in FIG. 2, in some embodiments, each parasitic patch 12 includes a rectangular area 121 and an edge trimming area 122 connected along the second direction b.

The rectangular area 121 is close to the radiation patch 11, the first edge 1201 is one of right-angled edges of the rectangular area 121, the edge trimming area 122 is connected to the second edge 1202 of the rectangular area 121, and the second edge 1202 is opposite to the first edge 1201 along the second direction b. A size of the edge trimming area 122 along the first direction a decreases in a direction away from the radiation patch 11.

Through the above arrangement, the parasitic patch 12 has a shape similar to a traveling wave antenna (such as a planar conical antenna), so that the characteristics of a traveling wave antenna may be presented; the work at different frequency bands may be realized by adjusting the shape and size of the edge trimming area 122, so that the radiation assembly 1 has a wide working frequency band, is also conducive to improving the radiation efficiency and antenna performance, and may realize a relatively high gain and radiation effect. By designing the edge trimming area 122 of different shapes and layouts, the precise control of the radiation directionality of the radiation assembly 1 may also be realized, and the requirements of different systems for the antenna radiation characteristics may be satisfied. In addition, the parasitic patch 12 of the present embodiment also makes the radiation assembly 1 have a low antenna profile, which is suitable for deployment in a limited space, and is particularly suitable for the disclosure scenario of a compact space. Thus, the radiation assembly 1 of the present embodiment may better meet the working requirements of the millimeter-wave antenna and is suitable for the disclosure scenario of the electronic device 300.

In some implementations, the edge trimming area 122 has a symmetrical or asymmetrical shape. When the edge trimming area 122 has a symmetrical shape, a symmetry axis of the edge trimming area 122 is parallel to a symmetry axis parallel to a long side of the rectangular area 121, and the two symmetry axes may or may not coincide. When the edge trimming area 122 has an asymmetrical shape, any parallel line of the edge trimming area 122 is asymmetrical along any parallel line of the symmetry axis parallel to the long side of the rectangular area 121.

For example, the edge trimming area 122 has a symmetrical shape, and the symmetry axis of the edge trimming area 122 is parallel and coincides with the symmetry axis parallel to the long side of the rectangular area 121.

In some implementations, the edge trimming area 122 may be a straight line trimming shape, a curve trimming shape, or a composite trimming shape of a straight line and a curve.

For example, the edge trimming area 122 is a triangle, at least two of three sides of the triangle are formed by the straight line trimming, the other side is connected to the second edge 1202 of the rectangular area 121, and equal in length to the second edge 1202 of the rectangular area 121 and coincides with the second edge 1202 of the rectangular area 121.

As illustrated in FIG. 2, in some embodiments, the edge trimming area 122 is an isosceles triangle, and a bottom edge of the edge trimming area 122 coincides with the second edge 1202. Through the above arrangement, the edge trimming area 122 is designed as a straight line trimming shape, and the symmetry axis is parallel and coincides with the symmetry axis parallel to the long side of the rectangular area 121, so that the parasitic patch 12 formed by the combination of the rectangular area 121 and the edge trimming area 122 has symmetrical and complete radiation characteristics, so that the parasitic patch 12 may be formed into a planar conical antenna, so that the radiation assembly 1 has a wide working frequency band, is also conducive to improving the radiation efficiency and antenna performance, and may achieve relatively high gain and radiation effect.

As illustrated in FIG. 2, in some embodiments, a value of an angle α of the vertex angle 1221 of the edge trimming area 122 ranges from 45° to 135°. When the angle of the vertex angle 1221 of the edge trimming area 122 satisfies the above value range, the parasitic patch 12 has better working performance.

In some implementations, the value of the angle α of the vertex angle 1221 of the edge trimming area 122 is, for example, 45°, 50°, 55°, 60°, 65°, 70°, 75°, 80°, 85°, 90°, 95°, 100°, 105°, 110°, 115°, 120°, 125°, 130°, 135°, and so on. For example, the value of the angle α of the vertex angle 1221 of the edge trimming area 122 is equal to 90°. That is, the edge trimming area 122 is an isosceles right triangle.

As illustrated in FIGS. 1, 2, and 3, in some embodiments, the radiation assembly 1 further includes at least one short-circuit probe 13, a top end of the at least one short-circuit probe 13 is electrically connected to the at least one parasitic patch 12, and a bottom end of the at least one short-circuit probe 13 passes through the dielectric layer 2 and is electrically connected to the floor layer 3.

In the present embodiment, in order to further increase the working bandwidth of the antenna unit 100 on the premise of ensuring small size, the at least one short-circuit probe 13 is arranged on the parasitic patch 12, to short-circuit the parasitic patch 12 to the floor layer 3, so that the current flow path in the radiation assembly 1 is increased through the electrical connection of the short-circuit probe 13 with the floor layer 3 without increasing a transverse size of the parasitic patch 12, thereby further extending the bandwidth of the antenna unit 100.

As illustrated in FIG. 2, in some embodiments, each parasitic patch 12 corresponds to one short-circuit probe 13, and the short-circuit probe 13 is arranged in a middle part of the parasitic patch 12. By arranging one short-circuit probe 13 in the middle part of the parasitic patch 12, a current flow path may be added to the middle part of the parasitic patch 12 to extend the bandwidth of the antenna unit 100.

As illustrated in FIG. 2, in some embodiments, each parasitic patch 12 corresponds to two short-circuit probes 13, and the two short-circuit probes 13 are symmetrically arranged on the parasitic patch 12 along the first direction a.

Through the above arrangement, the two short-circuit probes 13 may add at least two current flow paths to the parasitic patch 12, and because the two short-circuit probes 13 are symmetrically arranged, the current distribution of the parasitic patch 12 may be made more smooth, and a more stable resonant state may be obtained thereby. Further, when the antenna unit 100 has polarization characteristics, the short-circuit probe 13 is symmetrically arranged in the middle part of the parasitic patch 12, which may improve the performance consistency of the polarization antenna.

As illustrated in FIG. 2, in some embodiments, a diameter of the short-circuit probe 13 is −1, and a size of the parasitic patch 12 along the first direction a is L4, in which a value of ϕ1/L4 ranges from 0.15 to 0.21, and when two short-circuit probes 13 are provided, a distance between the two short-circuit probes 13 is L5, in which a value of ϕ1/L5 ranges from 0.2 to 0.4. When the short-circuit probe 13 satisfies the above value range, the parasitic patch 12 has better working performance.

In some implementations, the value of ϕ1/L4 is 0.15, 0.16, 0.17, 0.18, 0.187, 0.19, 0.2, 0.21, and so on. In some examples, the value of ϕ1/L4 is equal to 0.187.

In some implementations, the value of ϕ1/L5 is 0.2, 0.22, 0.24, 0.26, 0.28, 0.3, 0.32, 0.34, 0.36, 0.38, 0.4, and so on. In some examples, the value of ϕ1/L4 is equal to 0.3.

For example, the distance L5 between the short-circuit probes 13 ranges from 0.3 mm to 0.7 mm. For example, the value of L5 is 0.3 mm, 0.4 mm, 0.5 mm, 0.6 mm, 0.7 mm, and so on. In some examples, the value of L5 may be equal to 0.5 mm.

As illustrated in FIG. 3, in some embodiments, the feed structure 4 includes a coaxial feeder, an inner conductor 41 of the coaxial feeder passes through the floor layer 3 and the dielectric layer 2 sequentially and is electrically connected to the at least one radiation patch 11, and an outer conductor 42 of the coaxial feeder is electrically connected to the floor layer 3. The coaxial wire is a common signal transmission line, the copper core in the center (i.e., the inner conductor 41) is a transmitter of the high-level, wrapped by the insulating material, and an outside of the insulating material is a cylindrical thin layer of metal coaxial with the copper core (i.e., the outer conductor 42), which is a transmitter of the low level and plays a shielding role at the same time. Adopting coaxial feeder, the feed structure 4 of antenna unit 100 may be simplified, and the processing and manufacturing difficulty and processing cost of antenna unit 100 are reduced.

Figure 4:
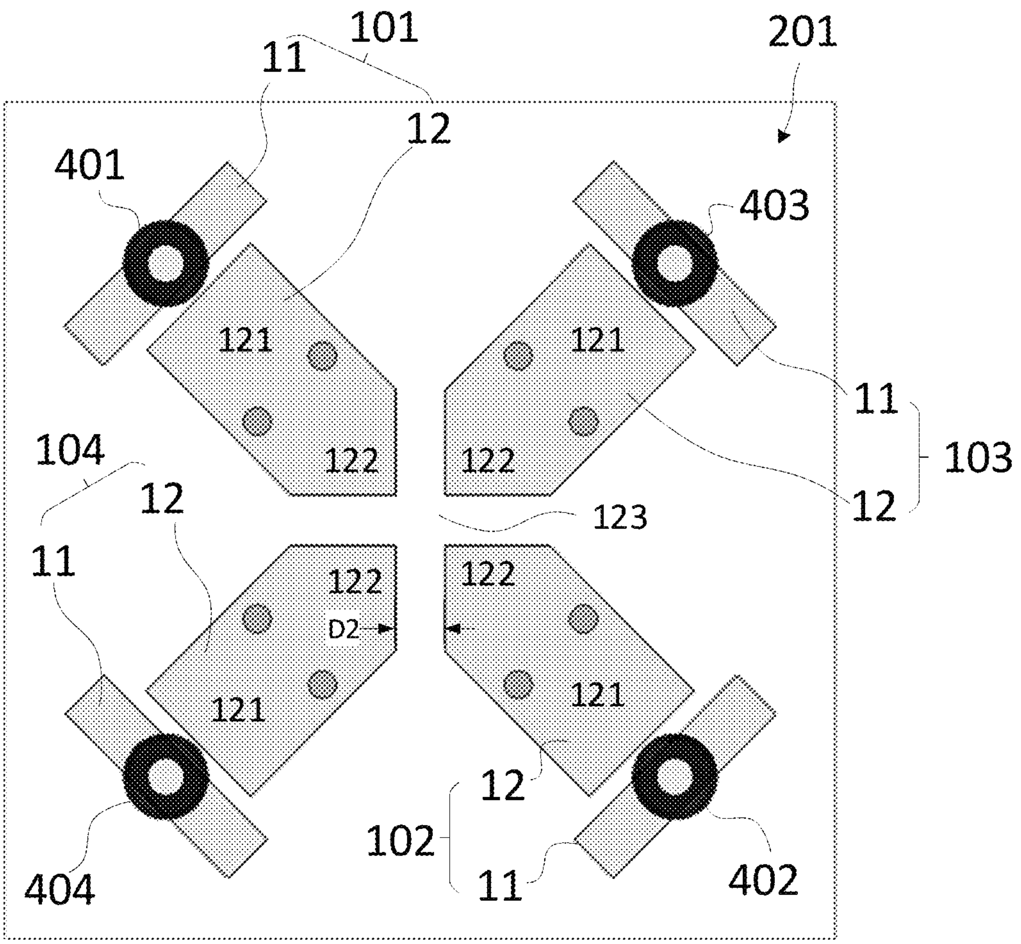
FIG. 4 is a structural top view of an antenna unit according to an embodiment of the present disclosure.

As illustrated in FIGS. 1 and 4, in some embodiments, the top surface 201 of the dielectric layer 2 is square.

The radiation assembly 1 includes four patch assemblies, and each patch assembly includes one radiation patch 11 and one parasitic patch 12; two of the four patch assemblies are symmetrically arranged along a diagonal of the top surface 201 as a first patch assembly 101 and a second patch assembly 102; the other two of the four patch assemblies are arranged symmetrically along another diagonal of the top surface 201 as a third patch assembly 103 and a fourth patch assembly 104. The first patch assembly 101 and the second patch assembly 102 are configured for excitation of a +45° polarization signal, and the third patch assembly 103 and the fourth patch assembly 104 are configured for excitation of a −45° polarization signal.

Through the above arrangement, the antenna unit 100 is formed into a dual-polarization millimeter-wave antenna, and due to excellent performances of each antenna unit 100 in high bandwidth, high isolation, etc., the dual-polarization millimeter-wave antenna realizes excellent performances of wide impedance bandwidth of about 60% (23.6-43.5 GHz) of the dual-polarization overlapping bandwidth, the isolation degree between the two orthogonal polarizations higher than 60 dB, the peak gain of 7.1 dBi, a stable and consistent radiation pattern simultaneously, and cross-polarization below −50 dB.

As illustrated in FIG. 4, in some embodiments, the parasitic patch 12 includes a rectangular area 121 and an edge trimming area 122, and the edge trimming area 122 is an isosceles triangle. Vertex angles 1221 of the four edge trimming areas 122 in the four patch assemblies are opposite, and a cross-shaped gap 123 is defined between the four edge trimming areas 122, and a center of the cross-shaped gap 123 coincides with a center of the top surface 201. In some examples, a value of a width D2 of the cross-shaped gap 123 may ranges from 0.25 mm to 0.3 mm.

Through the above arrangement, the antenna unit 100 may achieve a wide impedance bandwidth, a high isolation between orthogonal polarizations, and a stable and consistent radiation pattern.

As illustrated in FIG. 4, in some embodiments, the feed structure 4 includes a first feed structure 401, a second feed structure 402, a third feed structure 403 and a fourth feed structure 404.

The first feed structure 401 is electrically connected to the radiation patch 11 of the first patch assembly 101, the second feed structure 402 is electrically connected to the radiation patch 11 of the second patch assembly 102, feeding amplitudes of the first feed structure 401 and the second feed structure 402 are identical, and a feeding phase difference is 180°. The third feed structure 403 is electrically connected to the radiation patch 11 of the third patch assembly 103, the fourth feed structure 404 is electrically connected to the radiation patch 11 of the fourth patch assembly 104, feed amplitudes of the third feed structure 403 and the fourth feed structure 404 are identical, and a feed phase difference is 180°.

Through the above arrangement, the first patch module 101 and the second patch module 102 may form orthogonal polarization, achieve a wide impedance bandwidth, a high isolation between orthogonal polarization, and have a stable and consistent radiation pattern.

Figure 5:
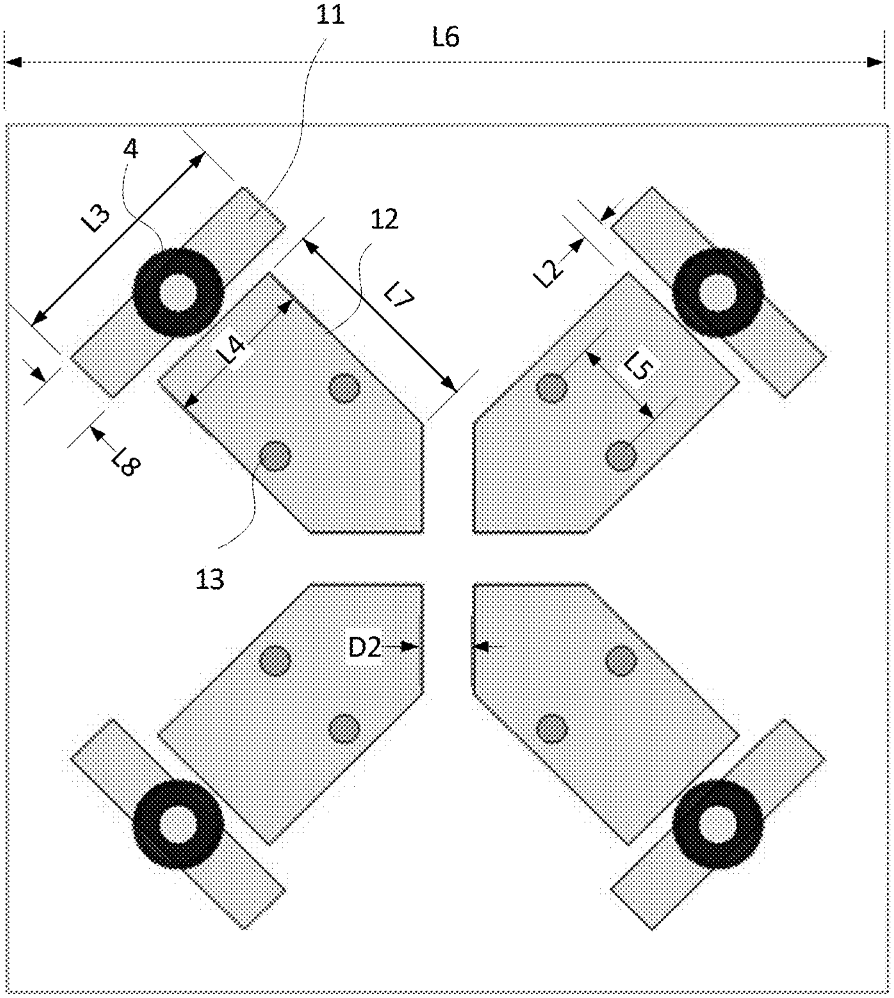
FIG. 5 is a schematic diagram of sizes of an antenna unit according to an embodiment of the present disclosure.

As illustrated in FIG. 5, in some embodiments, a vertical projection area of the antenna unit 100 is identical to the top surface 201 of the dielectric layer 2, and all are square, a side length of the square is L6, and a value of the side length L6 ranges from 4.0 mm to 5.0 mm. For example, the value of the side length L6 is 4.0 mm, 4.1 mm, 4.2 mm, 4.3 mm, 4.4 mm, 4.5 mm, 4.6 mm, 4.7 mm, 4.8 mm, 4.9 mm, and 5.0 mm. For example, the value of L6 is 4.5 mm.

In another embodiment, a value of a size L7 of the rectangular area 121 of the parasitic patch 12 along the second direction b ranges from 0.9 mm to 1.3 mm. For example, the value of L7 is 0.9 mm, 0.95 mm, 1.0 mm, 1.05 mm, 1.1 mm, 1.11 mm, 1.15 mm, 1.2 mm, 1.25 mm, 1.3 mm, etc. In some examples, the value of L7 may be equal to 1.11 mm.

A value of a size L8 of the radiation patch 11 along the second direction b ranges from 0.1 mm to 0.5 mm. For example, the value of L8 is 0.1 mm, 0.2 mm, 0.3 mm, 0.4 mm, 0.5 mm, and so on. In some examples, the value of L8 may be equal to 0.3 mm.

Figure 10:
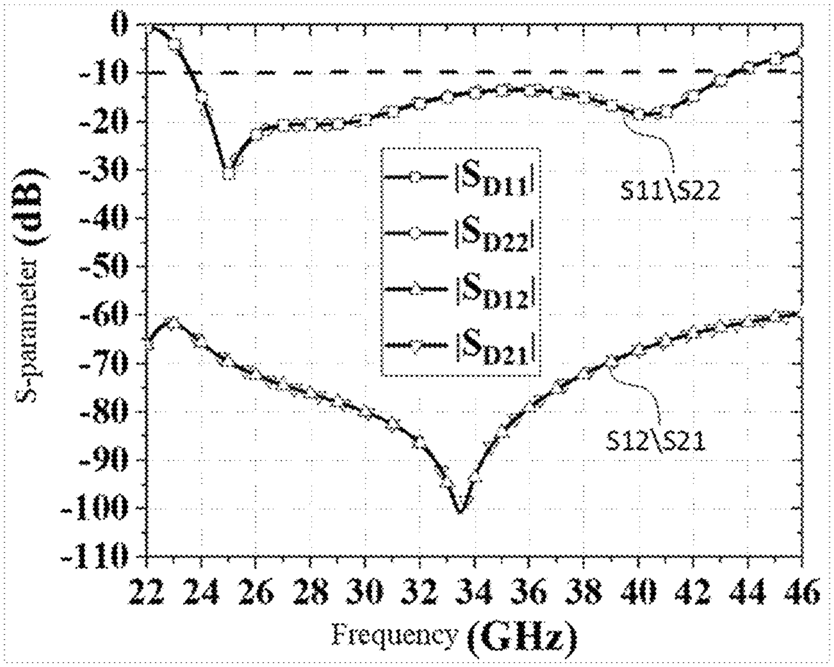
FIG. 10 is an S-parameter simulation effect diagram of an antenna unit according to an embodiment of the present disclosure.

FIG. 10 is an S-parameter simulation effect diagram of an antenna unit 100 according to an embodiment of the present disclosure. As may be seen from the figure, the S parameters of the antenna unit 100 in the millimeter-wave frequency band (including S11 (input matching), S22 (output matching), S21 (gain/loss), S12 (isolation)) are all lower than −10 dB, indicating that the antenna unit 100 has lower radiation loss in the millimeter-wave frequency band.

Figure 11:
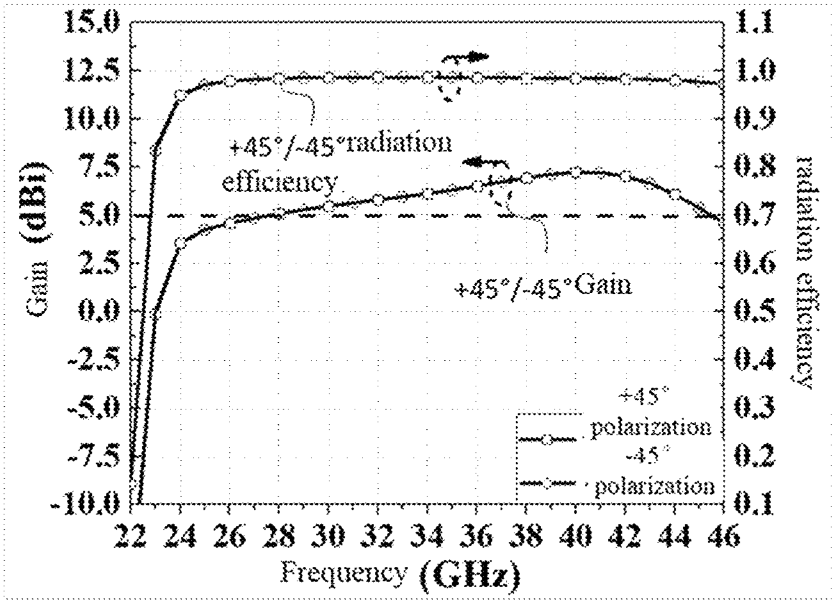
FIG. 11 is a gain and radiation efficiency simulation effect diagram of an antenna unit according to an embodiment of the present disclosure.

FIG. 11 is a gain and radiation efficiency simulation effect diagram of an antenna unit 100 according to an embodiment of the present disclosure. It may be seen from the figure that the +45° polarization radiation efficiency of the antenna unit 100 in the millimeter-wave frequency band is higher than 0.9, and the +45° polarization gain is higher than 5 dBi, indicating that the antenna unit 100 has better gain and radiation efficiency in the millimeter-wave frequency band.

Figure 12:
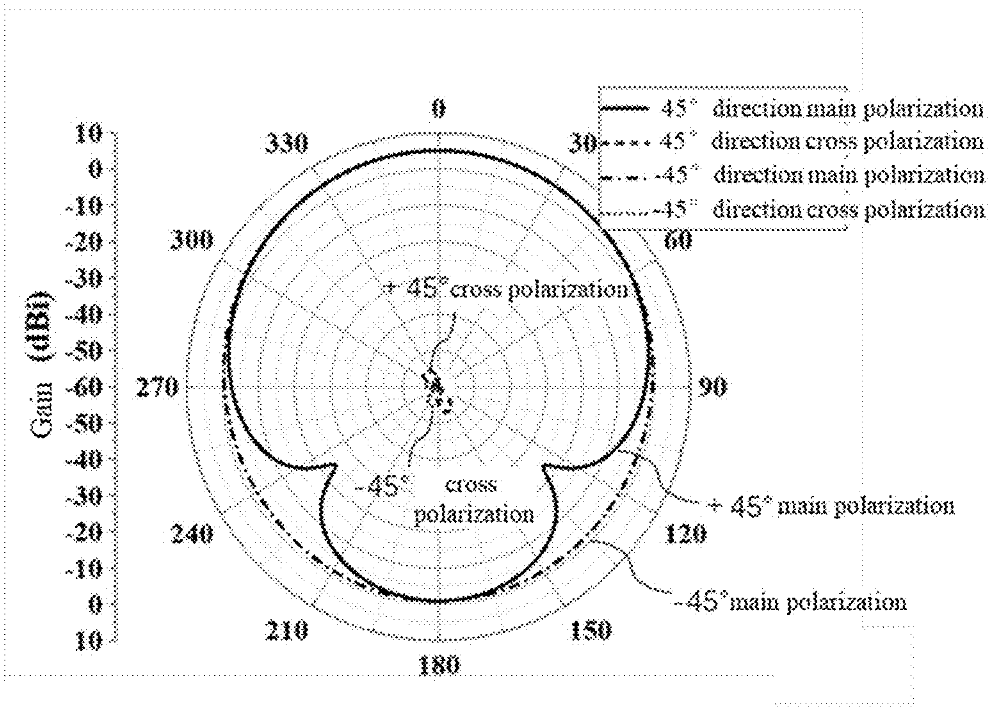
FIG. 12 is a radiation pattern of an antenna unit at a frequency point of 28 GHz according to an embodiment of the present disclosure.
Figure 13:
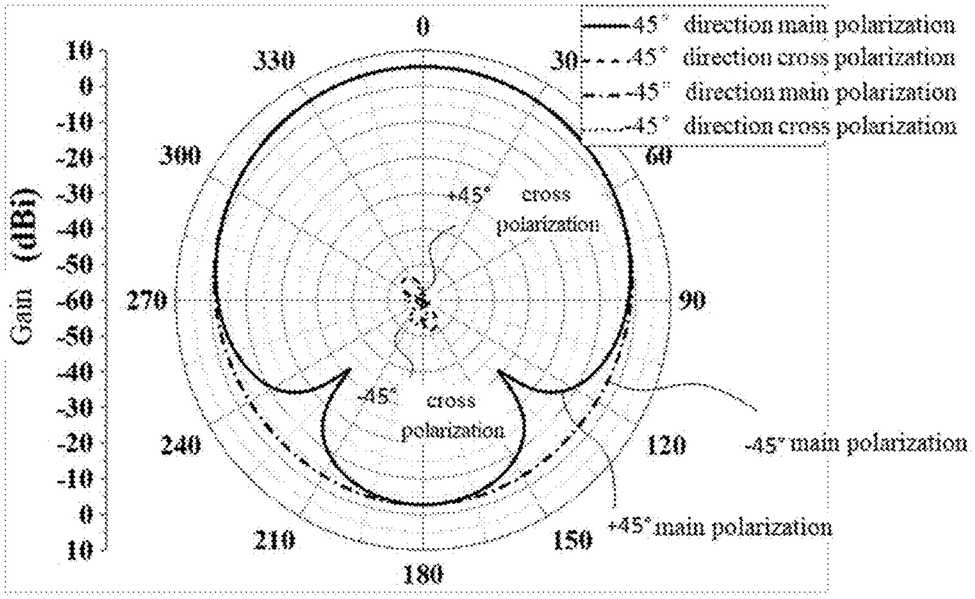
FIG. 13 is a radiation pattern of an antenna unit at a frequency point of 30 GHz according to an embodiment of the present disclosure.
Figure 14:
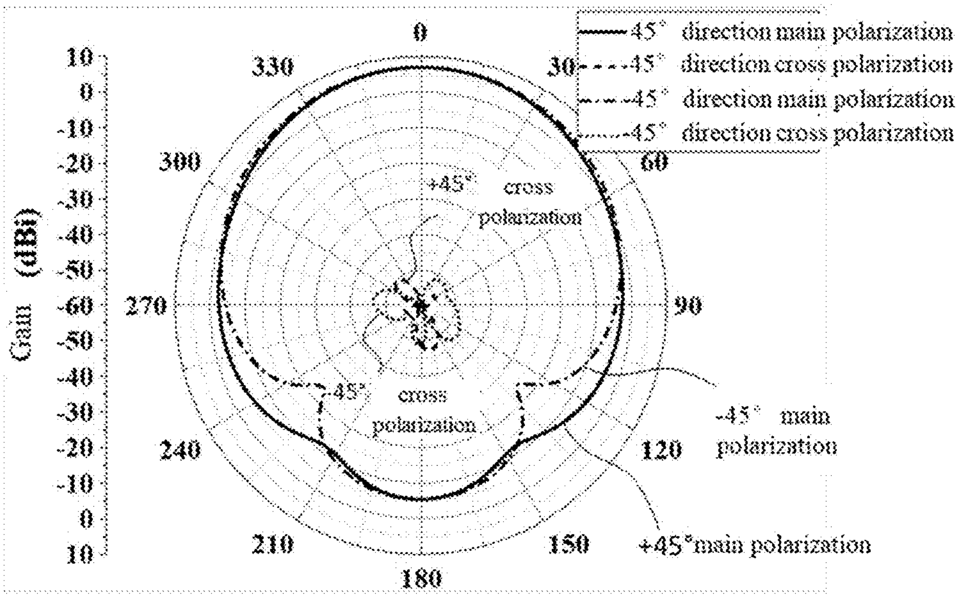
FIG. 14 is a radiation pattern of an antenna unit at a frequency point of 38 GHz according to an embodiment of the present disclosure.
Figure 15:
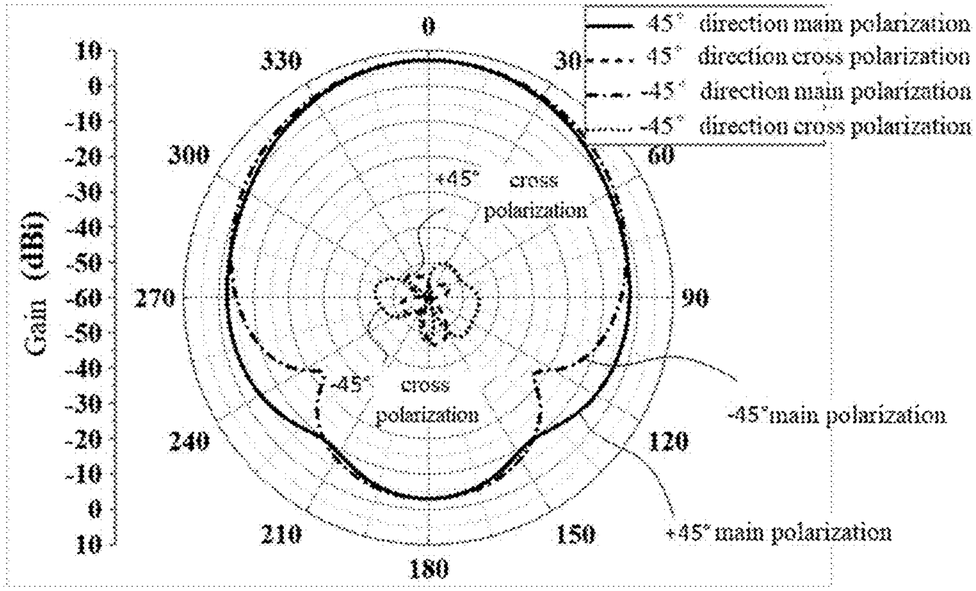
FIG. 15 is a radiation pattern of an antenna unit at a frequency point of 40 GHz according to an embodiment of the present disclosure.

FIG. 12 is a radiation pattern of the antenna unit 100 at a frequency point of 28 GHz according to an embodiment of the present disclosure. FIG. 13 is a radiation pattern of the antenna unit 100 at a frequency point of 30 GHz according to an embodiment of the present disclosure. FIG. 14 is a radiation pattern of the antenna unit 100 at a frequency point of 38 GHz according to an embodiment of the present disclosure. FIG. 15 is a radiation pattern of the antenna unit 100 at a frequency point of 40 GHz according to an embodiment of the present disclosure. As may be seen from the figures, the radiation patterns of the antenna unit 100 at the frequency points of 28 GHz, 30 GHz, 38 GHz and 40 GHz have stable and consistent characteristics.

Figure 6:
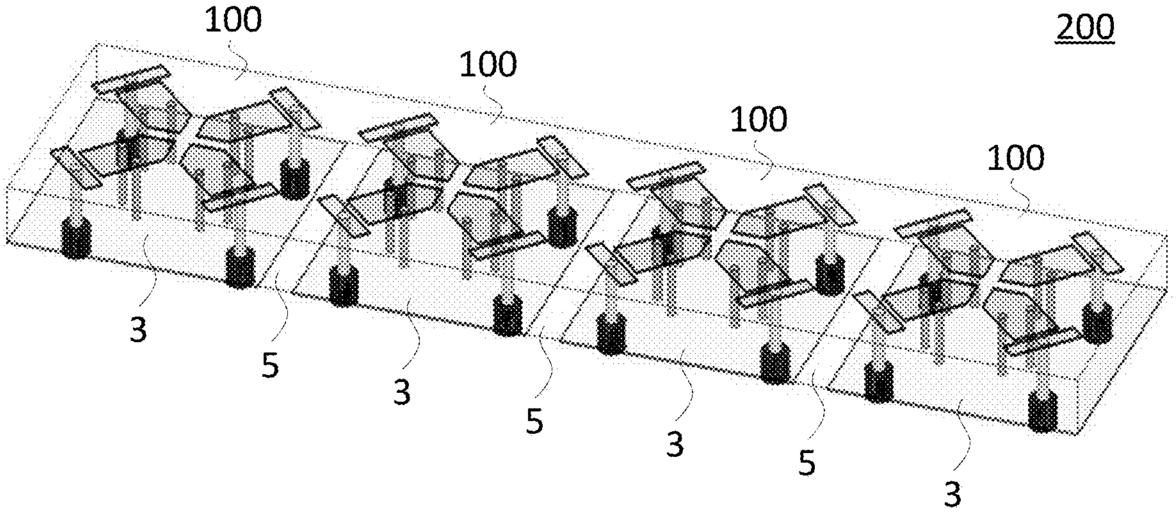
FIG. 6 is a schematic structural diagram of an antenna array according to an embodiment of the present disclosure.
Figure 7:
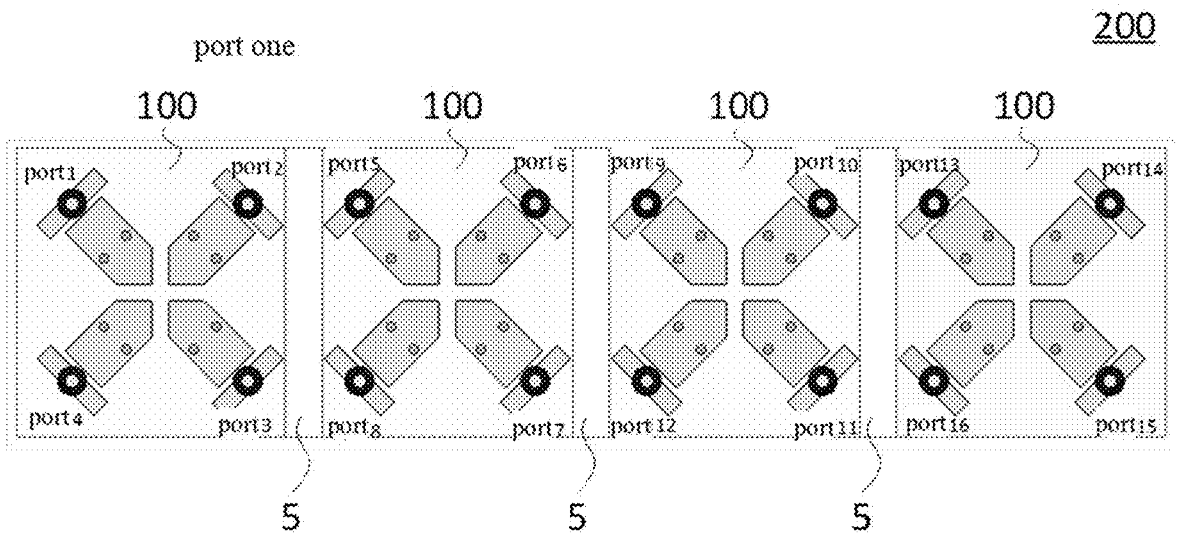
FIG. 7 is a structural top view of an antenna unit according to an embodiment of the present disclosure.
Figure 8:
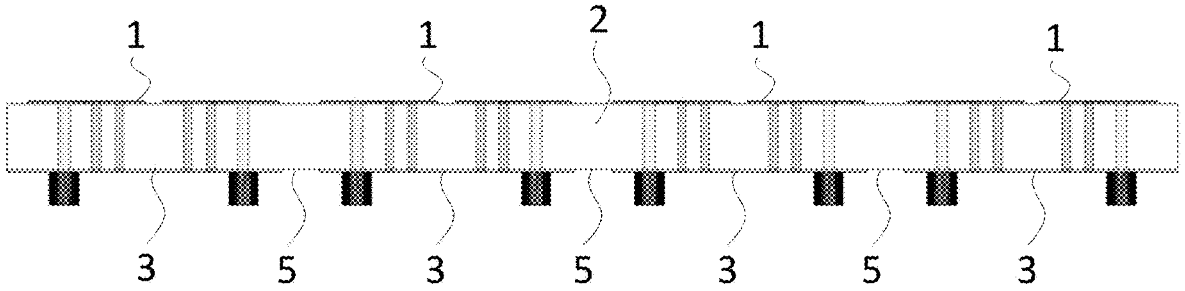
FIG. 8 is a structural side view of an antenna unit according to an embodiment of the present disclosure.

In another aspect, as illustrated in FIGS. 6, 7, and 8, an antenna array 200 is provided, the antenna array 200 includes at least two antenna units 100, and the antenna units 100 are provided as described in the present disclosure. The at least two antenna units 100 are arranged in an array, and the floor layers 3 of adjacent two antenna units 100 are separated by a fracture 5.

The antenna array 200 of the present embodiment adopts the antenna unit 100 of the present disclosure and has all the excellent technical effects of the present disclosure. In addition, by arranging the fracture 5 between the floor layers 3 of the adjacent antenna units 100, the coupling between the antenna units 100 may be reduced, and the mutual influence between the antenna units 100 may be weakened, so that the overall performance of the antenna array 200 may be improved and stabilized.

It should be noted that FIGS. 6 to 8 only show an example array mode, i.e., the array mode of 1×4, and the antenna array 200 of the present disclosure may also adopt any array mode such as 2×2, 2×3, 2×4, etc.

The antenna array 200 also maintains the excellent performance of the antenna unit 100 in the case of a size of only 4.5 mm*18 mm*1 mm, and realizes the excellent performances of wide impedance bandwidth of about 60% (24-44.5 GHz) of the dual-polarization overlap bandwidth, the coupling degree between the two antenna units 100 less than-14 dB, the peak gain of 12 dBi, a stable and consistent radiation pattern at the same time, and a cross-polarization less than-20 dB.

Taking the antenna array illustrated in FIGS. 6-7 as an example, the antenna array 200 includes four antenna units 100 arranged in an array mode of 1×4, each antenna unit 100 has four feed ports, a total of 16 feed ports, according to clockwise, and the 16 feed ports are numbered from left to right, as port 1, port 2, port 3, port 4, port 5, port 6, port 7, port 8, port 9, port 10, port 11, port 12, port 13, port 14, port 15, and port 16.

Similar to the feeding mode of the antenna unit 100, the feed phase difference of port 1 and port 3 of a left first antenna unit 100 is 180 degrees, and the amplitude is equal, that is, port 1 and port 3 form a first differential feed pair; port 5 and port 7 of a left second antenna unit 100 form a third differential feed pair; port 9 and port 11 of a left third antenna unit 100 form a fifth differential feed pair, and the port 13 and port 15 of a left fourth antenna unit 100 form a seventh differential feed pair. Therefore, the first, third, fifth, seventh differential feed pairs work simultaneously to excite +45° polarization. Similarly, port 2 and port 4 form a second differential feed pair, port 6 and port 8 form a fourth differential feed pair, port 10 and port 12 form a sixth differential feed pair, and port 14 and port 16 form an eighth differential feed pair, so that the second, fourth, sixth, and eighth differential feed pairs work simultaneously to excite −45° polarization.

Figure 16:
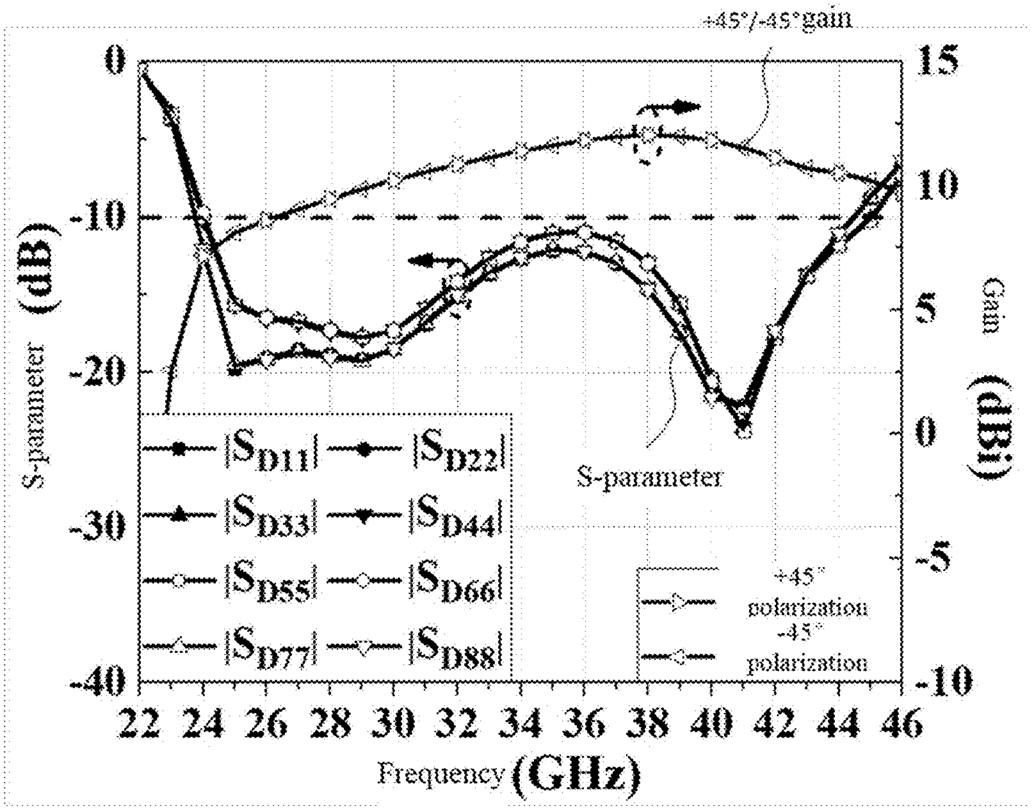
FIG. 16 is a gain and radiation efficiency simulation effect diagram of an antenna array according to an embodiment of the present disclosure.

FIG. 16 is a gain and radiation efficiency simulation effect diagram of the antenna array according to an embodiment of the present disclosure. In the figure, the S-parameter is on the left and the gain is on the right. First of all you may see that the gain of the +45° polarization is above 10 dBi. In the figure, $S_{D11}$ represents the return loss of the first differential feed pair, $S_{D22}$ represents the return loss of the second differential feed pair, and similarly, $S_{D33}$, $S_{D44}$, $S_{D55}$, $S_{D66}$, $S_{D77}$, $S_{D88}$ represent the return loss of their respective differential feed pairs, and it may be seen from the curve trend in the figure that the S parameters of the antenna array 200 in the millimeter-wave frequency band are lower than −10 dB, indicating that the antenna array 200 has lower radiation loss in the millimeter-wave frequency band.

Figure 17:
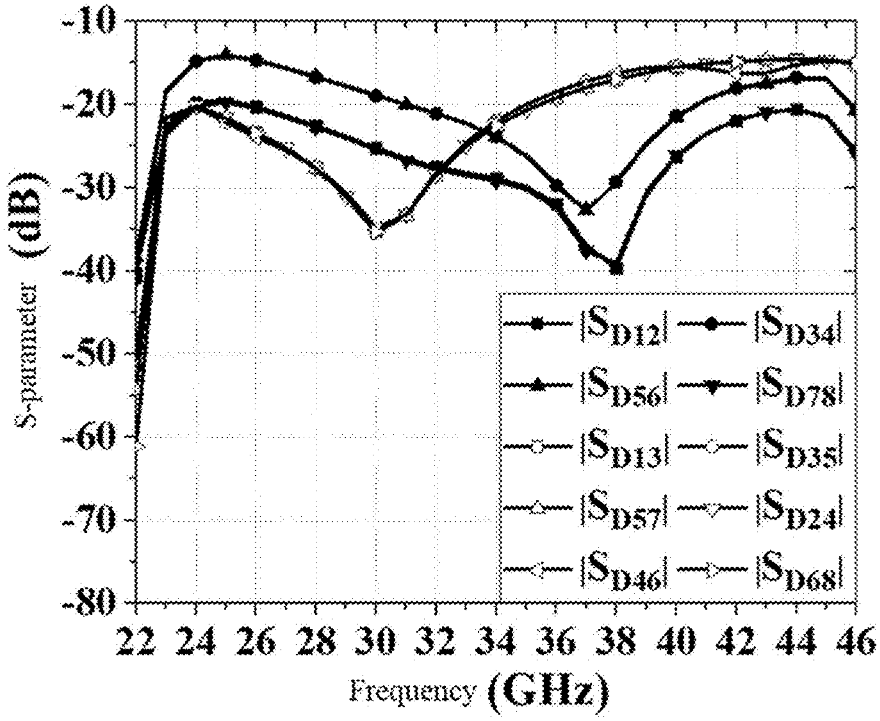
FIG. 17 is an isolation simulation effect of an antenna array according to an embodiment of the present disclosure.

FIG. 17 is an isolation simulation effect of the antenna array according to an embodiment of the present disclosure. In the figure, $S_{D12}$ represents the isolation between the first differential feed pair and the second differential feed pair, $S_{D34}$ represents the isolation between the third differential feed pair and the fourth differential feed pair, and similarly, $S_{D56}$, $S_{D78}$, $S_{D13}$, $S_{D35}$ respectively represent the isolation degree between corresponding differential feed pairs, and it may be seen from the curve trend in the figure that the isolation values of the antenna array 200 in the millimeter-wave frequency band are all lower than −15 dB, indicating that that the antenna array 200 has lower radiation loss in the millimeter-wave frequency band.

Figure 18:
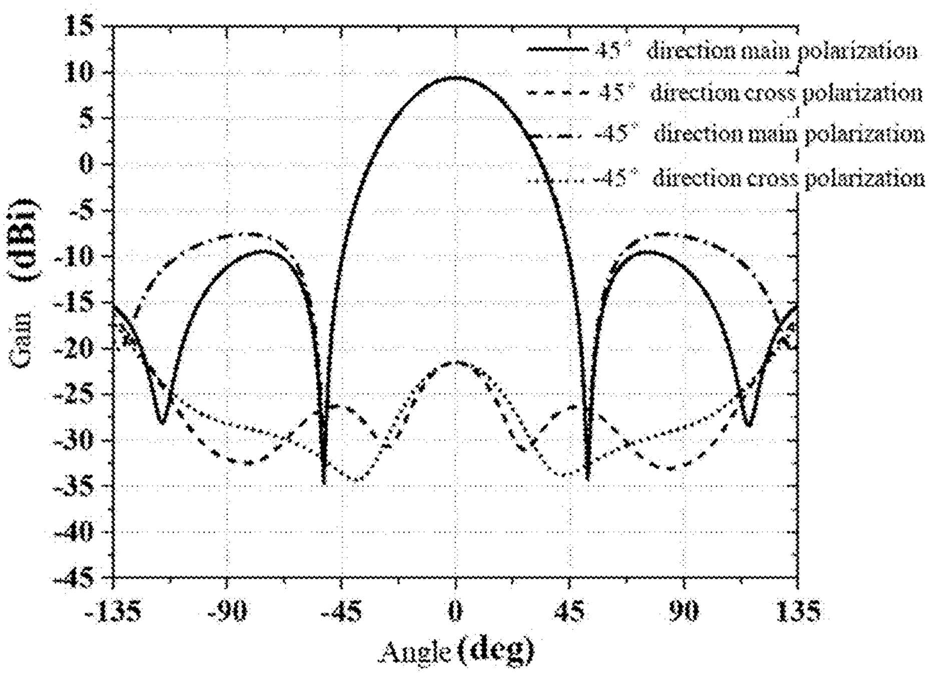
FIG. 18 is a radiation pattern of an antenna array at a frequency point of 28 GHz according to an embodiment of the present disclosure.
Figure 19:
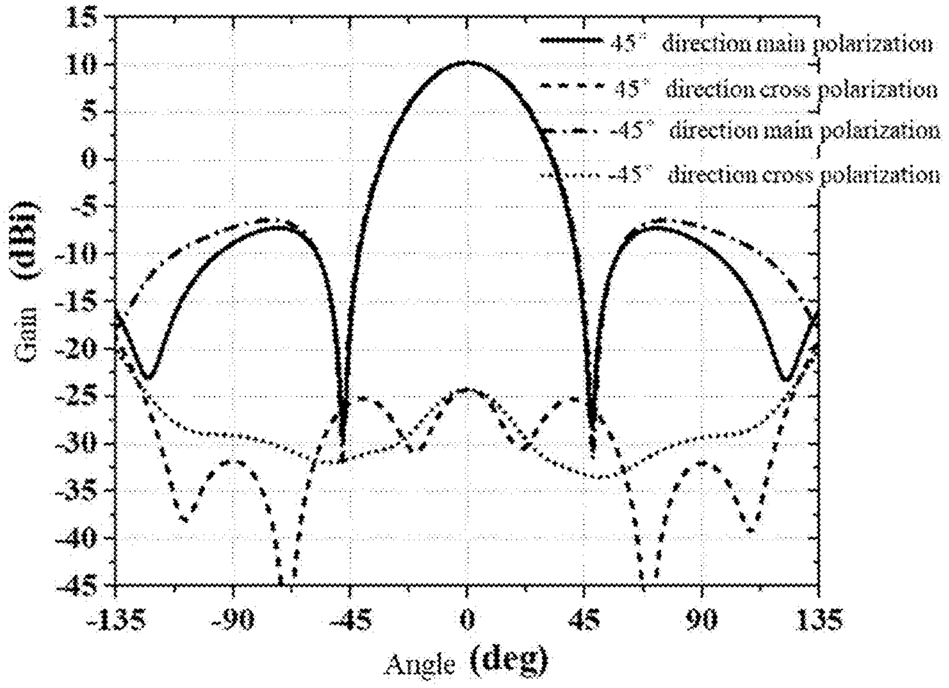
FIG. 19 is a radiation pattern of an antenna array at a frequency point of 30 GHz according to an embodiment of the present disclosure.
Figure 20:
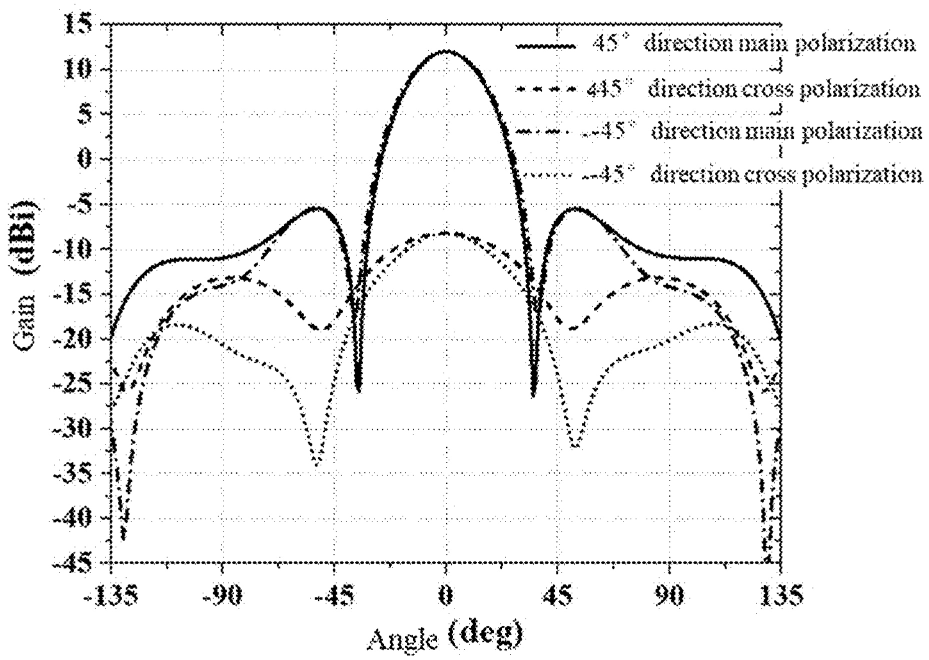
FIG. 20 is a radiation pattern of an antenna array at a frequency point of 38 GHz according to an embodiment of the present disclosure.
Figure 21:
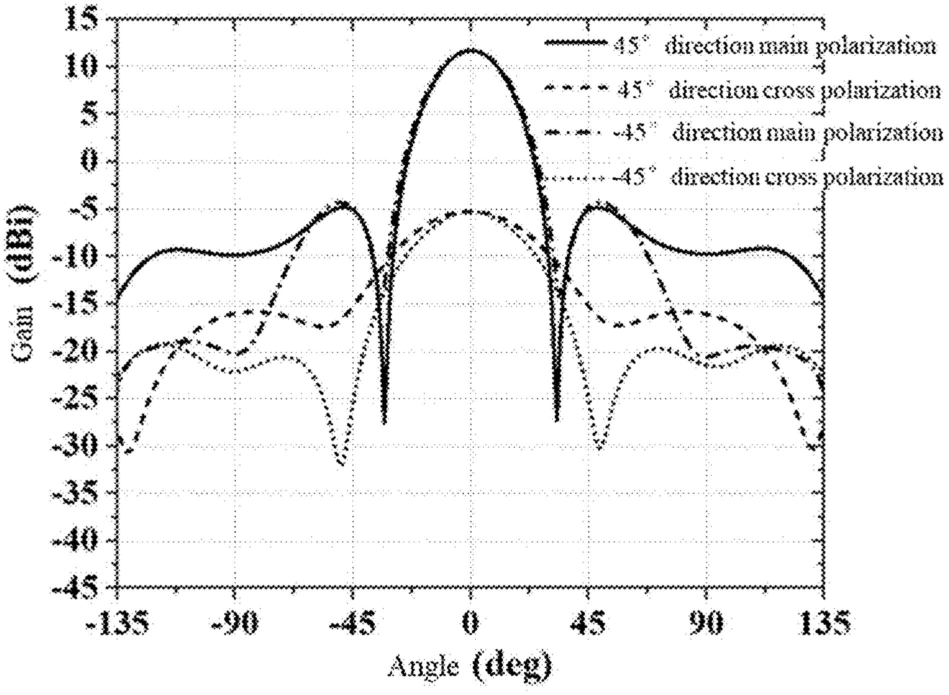
FIG. 21 is a radiation pattern of an antenna array at a frequency point of 40 GHz according to an embodiment of the present disclosure.

FIG. 18 is a radiation pattern of the antenna array at a frequency point of 28 GHz according to an embodiment of the present disclosure. FIG. 19 is a radiation pattern of the antenna array at a frequency point of 30 GHz according to an embodiment of the present disclosure. FIG. 20 is a radiation pattern of the antenna array at a frequency point of 38 GHz according to an embodiment of the present disclosure. FIG. 21 is a radiation pattern of the antenna array at a frequency point of 40 GHz according to an embodiment of the present disclosure. As may be seen from the figure, the radiation patterns of the antenna array 200 at the frequency points of 28 GHz, 30 GHz, 38 GHz and 40 GHz have stable and consistent characteristics.

Figure 9:
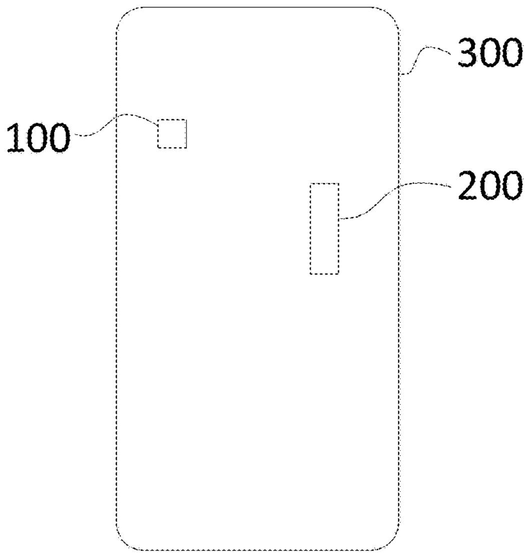
FIG. 9 is a schematic structural diagram of an electronic device according to an embodiment of the present disclosure.

In another aspect, as illustrated in FIG. 9, the present embodiment provides an electronic device 300, and the electronic device 300 includes an antenna unit 100 of the present disclosure or an antenna array 200 of the present disclosure. The antenna array 200 of the present embodiment adopts an antenna unit 100 or an antenna array 200 of the present disclosure and has all the excellent technical effects of the present disclosure.

In an aspect, an antenna unit is provided, and the antenna unit includes: a radiation assembly, a dielectric layer, a floor layer and at least one feed structure. The radiation assembly is located on a top surface of the dielectric layer, and the floor layer is located on a bottom surface of the dielectric layer. The dielectric layer includes a layer of dielectric substrate. The radiation assembly includes at least one radiation patch and at least one parasitic patch. The at least one feed structure passes through the floor layer and the dielectric layer sequentially and is electrically connected to the at least one radiation patch, and the at least one radiation patch is coupled to the at least one parasitic patch.

In some embodiments, the at least one radiation patch extends in a rectangular shape along a first direction, a first edge of the at least one parasitic patch extends along the first direction, the at least one radiation patch and the at least one parasitic patch are spaced apart along a second direction, and the second direction is perpendicular to the first direction, such that the at least one radiation patch and the first edge define a coupling gap, and an extension direction of the coupling gap is parallel to the first direction.

In some embodiments, a size of the coupling gap along the first direction is L1, and a size of the coupling gap along the second direction is L2, in which a value of L1/L2 ranges from 5 to 10; and/or, a size of the radiation patch along the first direction is L3, and a size of the first edge along the first direction is L4, in which a value of L3/L4 ranges from 1 to 2.

In some embodiments, a value of a thickness D1 of the dielectric substrate ranges from 08 mm to 1.2 mm.

In some embodiments, each parasitic patch includes a rectangular area and an edge trimming area connected along the second direction. The rectangular area is close to the radiation patch, the first edge is one of right-angled edges of the rectangular area, the edge trimming area is connected to a second edge of the rectangular area, and the second edge is opposite to the first edge along the second direction, and a size of the edge trimming area along the first direction decreases along a direction away from the radiation patch.

In some embodiments, the edge trimming area is an isosceles triangle, and a bottom edge of the cut edge area coincides with the second edge.

In some embodiments, a value of an angle α of a vertex angle of the edge trimming area ranges from 45° to 135°.

In some embodiments, the radiation assembly further includes at least one short-circuit probe, a top end of the at least one short-circuit probe is electrically connected to the at least one parasitic patch, and a bottom end of the at least one short-circuit probe passes through the dielectric layer and is electrically connected to the floor layer.

In some embodiments, each parasitic patch corresponds to one short-circuit probe, and the short-circuit probe is arranged in a middle part of the parasitic patch; or each parasitic patch corresponds to two short-circuit probes, and the two short-circuit probes are symmetrically arranged on the parasitic patch along the first direction.

In some embodiments, a diameter of the short-circuit probe is $\phi 1$, and a size of the parasitic patch along the first direction is L4, in which a value of $\phi 1/L4$ ranges from 0.15 to 0.21. When two short-circuit probes are provided, a distance between the two short-circuit probes is L5, in which a value of $\phi 1/L5$ ranges from 0.2 to 0.4.

In some embodiments, the feed structure includes a coaxial feeder, an inner conductor of the coaxial feeder is electrically connected to the at least one radiation patch, and an outer conductor of the coaxial feeder is electrically connected to the floor layer.

In some embodiments, the top surface of the dielectric layer is square. The radiation assembly includes four patch assemblies, and each patch assembly includes one radiation patch and one parasitic patch. Two of the four patch assemblies are symmetrically arranged along a diagonal of the top surface as a first patch assembly and a second patch assembly; and the other two of the four patch assemblies are symmetrically arranged along another diagonal of the top surface as a third patch assembly and a fourth patch assembly. The first patch assembly and the second patch assembly are configured for excitation of a +45° polarization signal, and the third patch assembly and the fourth patch assembly are configured for excitation of a −45° polarization signal.

In some embodiments, the parasitic patch includes a rectangular area and an edge trimming area, and the edge trimming area is an isosceles triangle. Vertex angles of the four edge trimming areas in the four patch assemblies are opposite, a cross-shaped gap is defined between the four edge trimming areas, and a center of the cross-shaped gap coincides with a center of the top surface.

In some embodiments, the feed structure includes a first feed structure, a second feed structure, a third feed structure and a fourth feed structure. The first feed structure is electrically connected to the radiation patch of the first patch assembly, the second feed structure is electrically connected to the radiation patch of the second patch assembly, feed amplitudes of the first feed structure and the second feed structure are identical, and a feed phase difference is 180°. The third feed structure is electrically connected to the radiation patch of the third patch assembly, the fourth feed structure is electrically connected to the radiation patch of the fourth patch assembly, feeding amplitudes of the third feed structure and the fourth feed structure are identical, and a feed phase difference is 180°.

In another aspect, an antenna array is provided, and the antenna array includes at least two antenna units as described in the present disclosure. The at least two antenna units are arranged in an array, and the floor layers of adjacent two antenna units are separated by a fracture.

In another aspect, an electronic device is provided, and the electronic device includes an antenna unit as described in the present disclosure or an antenna array as described in the present disclosure.

In the description of this specification, the reference terms "certain embodiments", "one embodiment", "some embodiments", "schematic embodiments", "examples", "specific examples", or "some examples" are intended to mean specific features, structures, materials or features contained in at least one embodiment or example of the present disclosure in conjunction with the description of said embodiments or examples.

The foregoing is example embodiments of the present disclosure and is not intended to limit the present disclosure, and any modification, equivalent replacement, improvement, etc., made within the principles of the present disclosure shall be included in the scope of protection of the present

What is claimed is:

1. An antenna unit, comprising:

a radiation assembly comprising at least one radiation patch and at least one parasitic patch;

a dielectric layer comprising a layer of dielectric substrate;

a floor layer; and at least one feed structure, wherein the radiation assembly is located on a top surface of the dielectric layer;

the floor layer is located on a bottom surface of the dielectric layer; and the least one feed structure passes through the floor layer and the dielectric layer sequentially and is electrically connected to the at least one radiation patch, and the at least one radiation patch is coupled to the at least one radiation parasitic patch;

wherein each parasitic patch comprises a rectangular area and an edge trimming area connected along a second direction; and the rectangular area is close to the radiation patch, a first edge is one of right-angled edges of the rectangular area, the edge trimming area is connected to a second edge of the rectangular area, the second edge is opposite to the first edge along the second direction, and a size of the edge trimming area along a first direction decreases in a direction away from the radiation patch.

2. The antenna unit according to claim 1, wherein the at least one radiation patch extends into a rectangular shape along the first direction, a first edge of the at least one parasitic patch extends along the first direction, the at least one radiation patch and the at least one parasitic patch are spaced apart along the second direction, and the second direction is perpendicular to the first direction, such that the at least one parasitic radiation patch and the first edge define a coupling gap, and an extension direction of the coupling gap is parallel to the first direction.

3. The antenna unit according to claim 2, wherein, a size of the coupling gap along the first direction is L1, and a size of the coupling gap along the second direction is L2, wherein a value of L1/L2 ranges from 5 to 10.

4. The antenna unit according to claim 2, wherein, a size of the radiation patch along the first direction is L3, and a size of the first edge along the first direction is L4, wherein a value of L3/L4 ranges from 1 to 2.

5. The antenna unit according to claim 2, wherein, a size of the coupling gap along the first direction is L1, and a size of the coupling gap along the second direction is L2, wherein a value of L1/L2 ranges from 5 to 10; and a size of the radiation patch along the first direction is L3, and a size of the first edge along the first direction is L4, wherein a value of L3/L4 ranges from 1 to 2.

6. The antenna unit according to claim 1, wherein a value of a thickness D1 of the dielectric substrate ranges from 0.8 mm to 1.2 mm.

7. The antenna unit according to claim 1, wherein the edge trimming area is an isosceles triangle, and a bottom edge of the edge trimming area coincides with the second edge.

8. The antenna unit according to claim 7, wherein a value of an angle $\alpha$ of a vertex angle of the edge trimming area ranges from 45° to 135°.

9. The antenna unit according to claim 7, wherein the edge trimming area is an isosceles right triangle.

10. The antenna unit according to claim 1, wherein the radiation assembly further comprises at least one short-circuit probe, a top end of the at least one short-circuit probe is electrically connected to the at least one parasitic patch, and a bottom end of the at least one short-circuit probe passes through the dielectric layer and is electrically connected to the floor layer.

11. The antenna unit according to claim 10, wherein each parasitic patch corresponds to one short-circuit probe, and the short-circuit probe is arranged in a middle part of the parasitic patch.

12. The antenna unit according to claim 10, wherein each parasitic patch corresponds to two short-circuit probes, and the two short-circuit probes are symmetrically arranged on the parasitic patch along the first direction.

13. The antenna unit according to claim 10, wherein a diameter of the short-circuit probe is $\phi 1$, and a size of the parasitic patch along the first direction is L4, wherein a value of $\phi 1$/L4 ranges from 0.15 to 0.21; and when two short-circuit probes are provided, a distance between the two short-circuit probes is L5, wherein a value of $\phi 1$/L5 ranges from 0.2 to 0.4.

14. The antenna unit according to claim 1, wherein the feed structure comprises a coaxial feeder, an inner conductor of the coaxial feeder is electrically connected to the at least one radiation patch, and an outer conductor of the coaxial feeder is electrically connected to the floor layer.

15. The antenna unit according to claim 1, wherein the top surface of the dielectric layer is square; and the radiation assembly comprises four patch assemblies, each patch assembly comprises one radiation patch and one parasitic patch; two of the four patch assemblies are symmetrically arranged along a diagonal of the top surface as a first patch assembly and a second patch assembly; the other two of the four patch assemblies are symmetrically arranged along another diagonal of the top surface as a third patch assembly and a fourth patch assembly; the first patch assembly and the second patch assembly are configured for excitation of a +45° polarization signal, and the third patch assembly and the fourth patch assembly are configured for excitation of a −45° polarization signal.

16. The antenna unit according to claim 15, wherein the radiation parasitic patch comprises a rectangular area and an edge trimming area, and the edge trimming area is an isosceles triangle; vertex angles of four edge trimming areas in the four patch assemblies are opposite, a cross-shaped gap is defined between the four edge trimming areas, and a center of the cross-shaped gap coincides with a center of the top surface.

17. The antenna unit according to claim 15, wherein the feed structure comprises a first feed structure, a second feed structure, a third feed structure and a fourth feed structure;

the first feed structure is electrically connected to the radiation patch of the first patch assembly;

the second feed structure is electrically connected to the radiation patch of the second patch assembly, feed amplitudes of the first feed structure and the second feed structure are identical, and a feed phase difference is 180°;

the third feed structure is electrically connected to the radiation patch of the third patch assembly; and the fourth feed structure is electrically connected to the radiation patch of the fourth patch assembly, feed amplitudes of the third feed structure and the fourth feed structure are identical, and a feed phase difference is 180°.

18. An antenna array, comprising:

at least two antenna units, each of the at least two antenna units comprising:

a radiation assembly comprising at least one radiation patch and at least one parasitic patch;

a dielectric layer comprising a layer of dielectric substrate;

a floor layer; and at least one feed structure, wherein the radiation assembly is located on a top surface of the dielectric layer;

the floor layer is located on a bottom surface of the dielectric layer; and the least one feed structure passes through the floor layer and the dielectric layer sequentially and is electrically connected to the at least one radiation patch, and the at least one radiation patch is coupled to the at least one parasitic patch, and wherein the at least two antenna units are arranged in an array, and floor layers of adjacent two antenna units are separated by a fracture, each parasitic patch comprises a rectangular area and an edge trimming area connected along a second direction; and the rectangular area is close to the radiation patch, a first edge is one of right-angled edges of the rectangular area, the edge trimming area is connected to a second edge of the rectangular area, the second edge is opposite to the first edge along the second direction, and a size of the edge trimming area along a first direction decreases in a direction away from the radiation patch.

19. An electronic device, comprising:

an antenna unit comprising:

a radiation assembly comprising at least one radiation patch and at least one parasitic patch;

a dielectric layer comprising a layer of dielectric substrate;

a floor layer; and at least one feed structure, wherein the radiation assembly is located on a top surface of the dielectric layer;

the floor layer is located on a bottom surface of the dielectric layer; and the least one feed structure passes through the floor layer and the dielectric layer sequentially and is electrically connected to the at least one radiation patch, and the at least one radiation patch is coupled to the at least one parasitic patch, wherein each parasitic patch comprises a rectangular area and an edge trimming area connected along a second direction; and the rectangular area is close to the radiation patch, a first edge is one of right-angled edges of the rectangular area, the edge trimming area is connected to a second edge of the rectangular area, the second edge is opposite to the first edge along the second direction, and a size of the edge trimming area along a first direction decreases in a direction away from the radiation patch.

* * * * *